United States Patent
Hiraoka et al.

[11] Patent Number: 5,181,871
[45] Date of Patent: Jan. 26, 1993

[54] SUCTIONED AIR INTRODUCING SYSTEM FOR THE OUTBOARD MOTOR

[75] Inventors: Noriyoshi Hiraoka; Toyoshi Suzuki, both of Hamamatsu, Japan

[73] Assignee: Sanshin Kogyo Kabushiki Kaisha, Hamamatsu, Japan

[21] Appl. No.: 805,303

[22] Filed: Dec. 10, 1991

[30] Foreign Application Priority Data

Dec. 13, 1990 [JP] Japan .................. 2-419170

[51] Int. Cl.$^5$ ............................................. B63H 21/24
[52] U.S. Cl. ................................. 440/77; 123/195 C
[58] Field of Search .................. 440/77, 88, 89; 123/195 C, 195 P

[56] References Cited

U.S. PATENT DOCUMENTS

| | | | |
|---|---|---|---|
| 3,610,198 | 10/1971 | Alexandrowicz | 440/77 |
| 4,379,702 | 4/1983 | Takada et al. | 440/77 |
| 4,403,971 | 9/1983 | Kobayashi et al. | 440/88 |
| 4,522,602 | 6/1985 | Okazaki | 440/77 |
| 4,571,193 | 2/1986 | Takada et al. | 440/77 |
| 4,722,709 | 2/1988 | Irwin et al. | 440/89 |
| 4,723,927 | 2/1988 | Walsh et al. | 440/77 |
| 4,734,070 | 3/1988 | Mondek | 440/77 |
| 4,867,120 | 9/1989 | Boda et al. | 440/77 |
| 4,869,693 | 9/1989 | Curtis et al. | 123/195 P |
| 5,046,976 | 9/1991 | Kobayashi et al. | 440/77 |
| 5,052,353 | 10/1991 | Dunham | 440/77 |
| 5,052,960 | 10/1991 | Kato | 440/77 |

FOREIGN PATENT DOCUMENTS

| | | | |
|---|---|---|---|
| 60-222394 | 3/1985 | Japan . | |
| 207294 | 9/1986 | Japan | 440/77 |
| 2-185892 | 7/1990 | Japan . | |

*Primary Examiner*—Jesus D. Sotelo
*Attorney, Agent, or Firm*—Ernest A. Beutler

[57] ABSTRACT

The present invention provides an improved cowling and air inlet arrangement for the powerhead of an outboad motor, having an internal combustion engine including an induction system, which will prevent water from splashing upon the outer surface of the engine contained therein. Damage to the engine due to corrosion, or other such phenomena is avoided, since the arrangement of the invention does not permit water to impinge upon the engine.

16 Claims, 4 Drawing Sheets

SUCTIONED AIR INTRODUCING SYSTEM FOR THE OUTBOARD MOTOR

BACKGROUND OF THE INVENTION

This invention relates to an air intake arrangement for an outboard motor, and more particularly to an improved protective cowling and air inlet arrangement for the power head of an outboard motor.

It is well known with outboard motors that the powering internal combustion engine is normally enclosed within a protective cowling so as to provide protection and a better appearance, as well as a noise silencing function, for the outboard motor. The protective cowling defines a cavity in which the internal combustion engine is contained.

It is also well known that the engine must be supplied with copious amounts of air for the engine induction system. Conventionally, the protective cowling includes an air inlet positioned in the upper rear portion thereof. This air inlet generally has an upwardly and rearwardly facing opening, and may have sidewardly facing openings as well, to permit air to flow into the cavity of the protective cowling for supply to the engine induction system. See for example U.S. Pat. No. 4,571,193 to Takada et al. Typically a further cowling member is provided that extends across the rearwardly facing air inlet opening so as to prevent foreign objects from falling into this inlet. The further cowling member also defines the overall cowling arrangement along the region of the rearwardly facing air inlet opening.

Air inlets with rearwardly facing openings are normally incorporated so that under normal operating conditions water will not enter into the interior of the cowling and the engine induction system. One such arrangement includes a midway chamber disposed between the air intake port of the cowling and the induction system of the engine. In this arrangement, any water which might enter the cowling along with the air is generally separated from the air within the midway chamber. Under certain conditions, however, such an arrangement can permit water to enter into the interior of the protective cowling and damage the engine. Such damage can take the form, for example, of engine corrosion, especially when the vessel is operating in a body of salt water. Further, the electrical parts of the outboard motor may be damaged, or water may enter the induction system of the engine and impair engine performance. Such an air inlet can be especially susceptible to the entry of water when the speed of the marine vessel is quickly reduced during operation so that a wave strikes the rear of the marine vessel and outboard motor.

It is, therefore, a principle object of this invention to provide an improved cowling and air inlet arrangement for the powerhead of an outboard motor which will prevent water from splashing upon the outer surface of the engine, thereby preventing corrosion of the engine's outer surface.

SUMMARY OF THE INVENTION

One feature of the present invention is adapted to be embodied in a cowling and air intake arrangement for a powerhead of an outboard motor having an internal combustion engine, including an induction system. In accordance with this feature, a main cowling portion is fixed to a lower cowling tray. An engine cavity is defined between the main cowling portion and the lower cowling tray. An air intake chamber is formed in an upper, rearward portion of the main cowling portion. An air intake port opens to the atmosphere along a rearward portion of the air intake chamber. An air passage duct is positioned laterally adjacent to the air intake chamber. The air intake chamber and the air passage duct are provided with respective floors which substantially partition the bottom portions of the air intake chamber and the air passage duct from the engine cavity. Also, the air intake chamber and the air passage duct are provided with respective walls which extend upwardly from the floors. The invention further comprises a passageway which communicates the air intake chamber with the air passage duct. A gap is located between an uppermost portion of the wall of the air passage duct and an inner, upper portion of the main cowling for allowing air flowing towards the engine induction system to pass from the air passage duct into the engine cavity.

Another feature of the present invention is adapted to be embodied in a protective outer cowling for the internal combustion engine of an outboard motor. The protective cowling, in accordance with this feature, comprises a main cowling member defining, at least in part, a cavity in which the engine is contained. A duct forming member is affixed to the main cowling member to define an air inlet path from an atmospheric air inlet formed, at least in part, by the outer cowling member and the cavity. The air inlet path is defined, at least in part, by portions of the main cowling member and the duct forming member which extend horizontally above the outer periphery of the engine so that air entering the cavity must flow horizontally across the upper portion of the engine for preventing any entrained water from falling vertically onto the engine.

DETAILED DESCRIPTION OF THE PREFERRED EMBODIMENT

Figure 1:
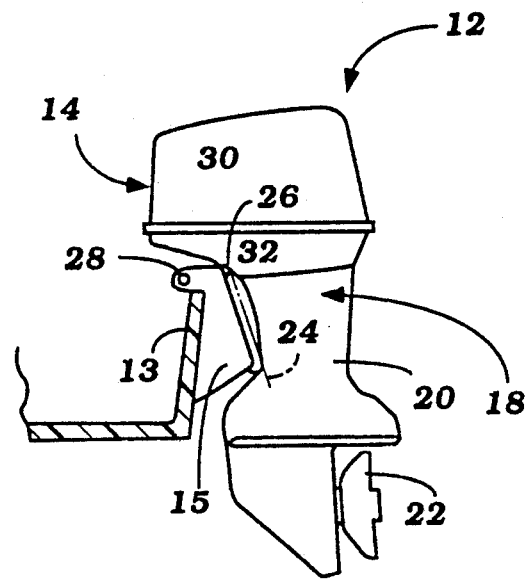
FIG. 1 is a side elevational view of an outboard motor constructed in accordance with this invention.

Referring first primarily to FIG. 1, an outboard motor constructed in accordance with the present invention is identified generally by the reference numeral 12 and is shown as attached to a transom 13 of an associated watercraft by way of a clamp bracket 15. The outboard motor is comprised of a powerhead, indicated generally by the reference numeral 14 which includes an internal combustion engine, shown in phantom in FIGS. 2, 3 and 4, and identified by the reference numeral 16.

An engine output shaft (not shown) of the engine 16 drives a drive shaft (not shown) that is journalled within a drive shaft housing 18 which depends from the power head 14. This drive shaft, in turn, drives a forward, neutral, reverse transmission (not shown), contained within a lower unit 20 of the drive shaft housing 18, which drives a propeller 22 in selected forward and reverse directions.

A steering shaft 24 is affixed to the drive shaft housing 18 in a known manner and journals the outboard motor 12 for steering movement about a generally vertically extending axis within a swivel bracket 26. The swivel bracket 26 is, in turn, connected to the clamping bracket 15 for pivotal movement about a horizontally extending tilt and trim axis by a pivot pin 28. The construction of the outboard motor as thus far described may be considered to be conventional. For that reason, further details of its construction are not believed to be necessary to understand the construction and operation of the invention.

Figure 2:
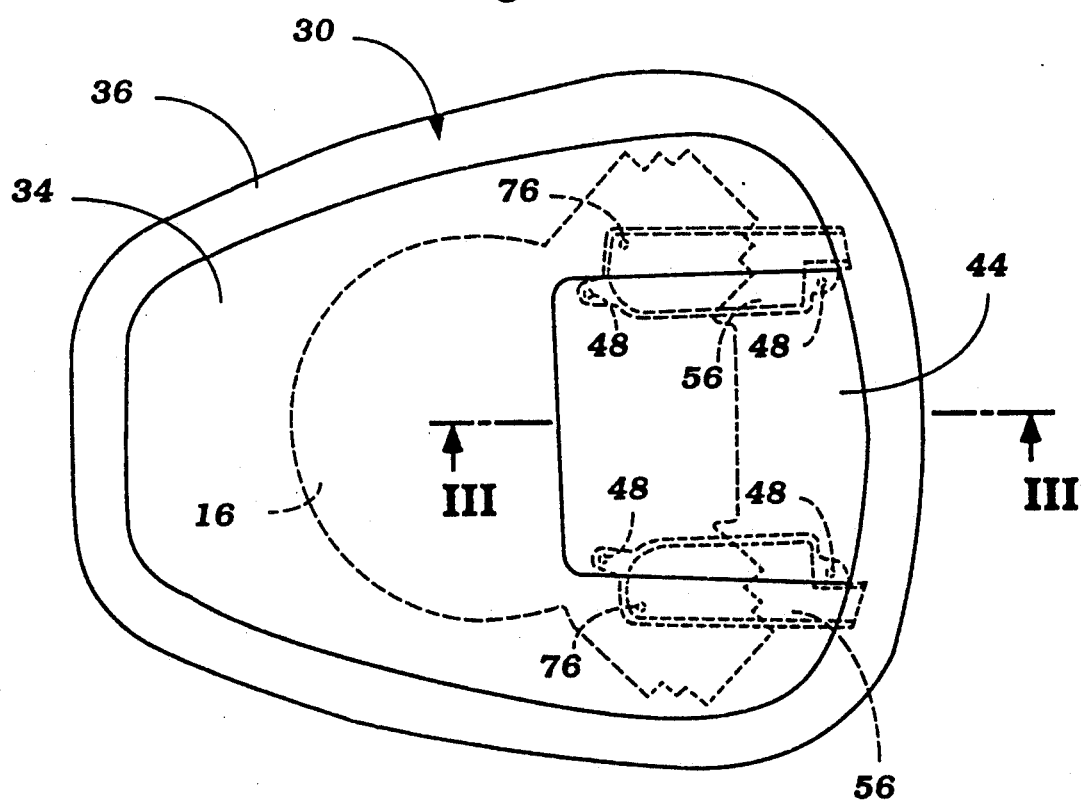
FIG. 2 is a top perspective view showing the protective cowling of the invention, with portions of the engine and air flow introducing arrangement shown in phantom.
Figure 3:
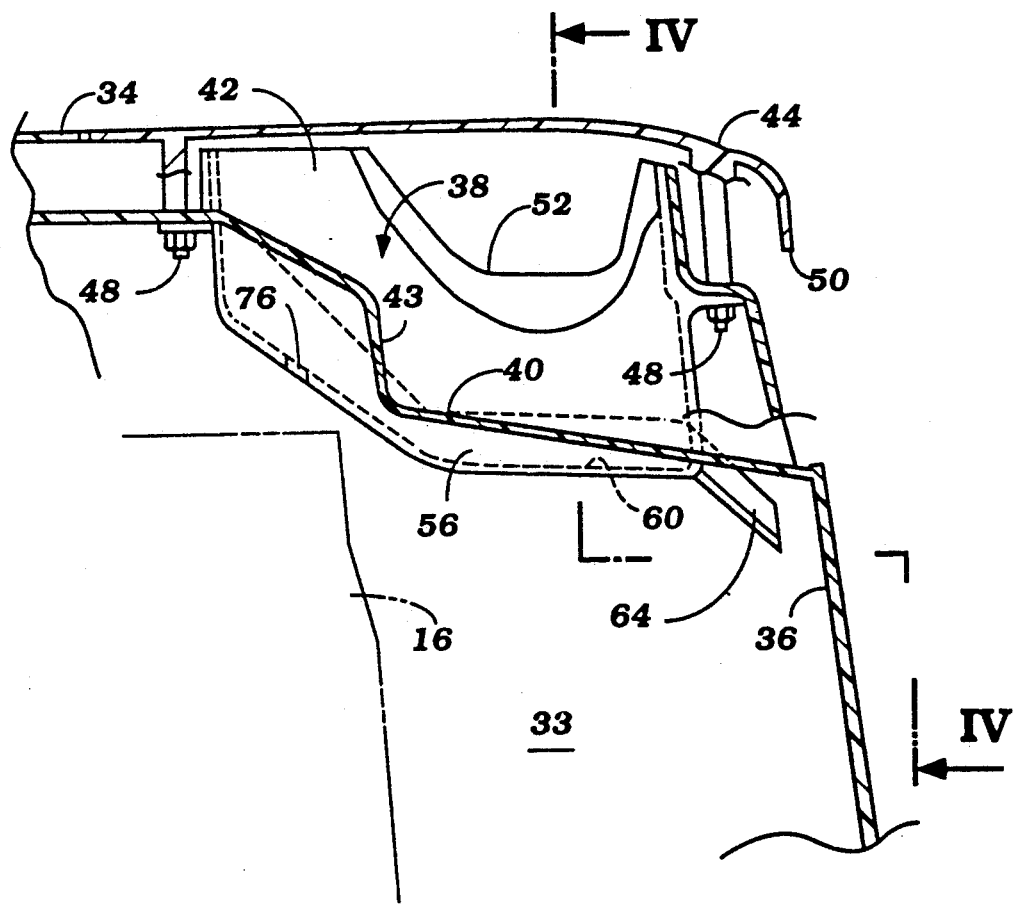
FIG. 3 is an enlarged cross sectional view of the protective cowling showing the engine in phantom and taken generally along the line III—III of FIG. 2.
Figure 4:
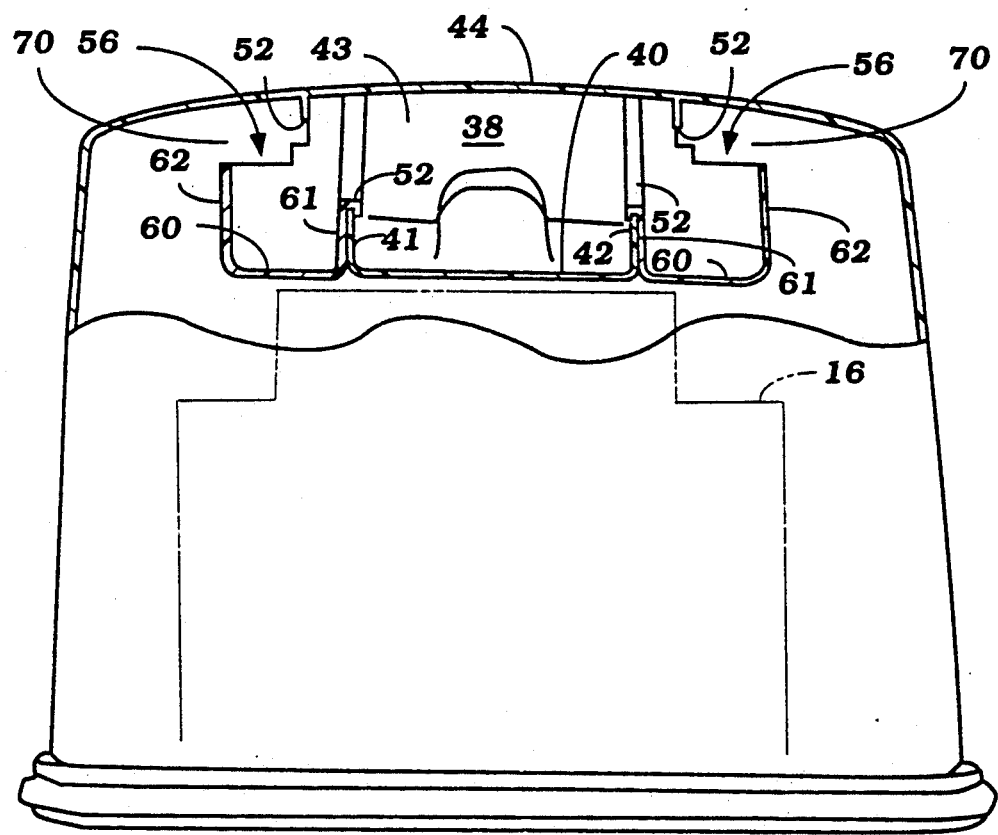
FIG. 4 is a rear sectional view of the protective cowling arrangement of the invention, with the engine shown in phantom, taken generally along the line IV—IV of FIG. 3.

Referring now additionally to the remaining figures (FIGS. 2 through 5), the cowling assembly of the invention will next be described. The cowling assembly encases the engine 16, and includes a top cover member 30 and a lower tray member 32. The top cover 30 is typically formed from a lightweight plastic material. The top cover 30 has a generally inverted cup shape and typically carries a plurality of latch keepers (not shown) that are formed at the lower end thereof for cooperation with releasable latch mechanisms (not shown) carried by the tray 32 for detachably affixing the top cover 30 and tray 32 to one another. When so affixed, this top cover 30 defines a cavity 33 in which the internal combustion engine 16 and its associated parts are contained. The top cover 30 specifically comprises an upper generally horizontally disposed flat upper portion 34 and a generally vertically disposed side wall, denoted generally by the reference numeral 36, extending downwardly from the flat upper portion 34, as shown in FIGS. 2 and 3.

The engine 16, contained within the cavity 33, includes an induction system, and air must be supplied to this induction system through a suitable inlet, since the top cover 30 generally fully encloses the internal combustion engine 16. For this purpose, a recess is formed through an upper, rearward area of the upper portion 34 of the top cover 30. This recess is referred to herein as a "midway chamber," and is denoted generally by the reference numeral 38 (See FIGS. 3 through 5).

The midway chamber 38 is defined, in part, by a bottom wall 40 which slopes downwardly slightly in a direction from a forwardmost portion of the midway chamber 38 towards the rearwardmost area thereof. Further defining the midway chamber 38 are side walls 41, 42, and 43 which extend upwardly from the bottom wall 40 in a region along each sideward portion, and also along the forwardmost portion, of the midway chamber 38, as shown in the Figures. The rearwardmost end of the bottom wall 40 adjoins the side wall 36 of the top cover 30.

Also defining the midway chamber 38 is a cover member 44 which extends generally horizontally across the top of the midway chamber 38. The upper surface of the cover member 44 is arranged so that it is generally flush with the upper portion 34 of the top cover 30. The cover member 44 is fastened to the cowling top cover 30 by way of four nut and bolt assemblies 48. The bolt members of these arrangements 48 are cast molded within boss portions of the cover member 44, as illustrated in FIG. 3.

The midway chamber 38 communicates with the atmosphere by way of an air intake port 50 disposed along its rearwardmost region. The perimeter of the air intake port 50 is defined by the rearward ends of the cover member 44, the bottom wall 40 and associated side walls 41 and 42. Each of the leftward and rightwardly located portions of the midway chamber side walls 41 and 42 have cut-out semi-circular portions which in part comprise intake air introducing ports 52. The intake air introducing ports 52 communicate the midway chamber 38 with associated intake air passage ducts 56, which are described in greater detail below.

Preferably, the portions of the midway chamber side walls 41 and 42 located below the lowermost level of the intake air introducing ports 52 are curved inwardly toward the center of the outboard motor 12 beginning along their longitudinally central regions; while those portions of the side walls 41 and 42 above this level of the ports 52 are generally straight along their longitudinal direction. Thus, such a construction imparts a lateral offset between the lower side wall portions 41 and 42 below the lowermost level of the ports 52 and the side wall portions 41 and 42 above such level (See FIG. 4). This offset and the semi-circular cut-out portions, described above, together constitute the entire intake air introducing ports 52.

Two intake air passage ducts 56, preferably comprised of a rubber material, are disposed within the engine cavity 33, with one intake passage duct 56 disposed to each lateral side of the midway chamber 38. These intake air passage ducts 56 are fastened to the top cover 30 of the cowling assembly by way of the bolt assemblies 48, set forth above, which are cast molded within the boss portions of the cover member 44.

The passage ducts 56 are provided with a bottom wall 60 which slopes downward slightly in a direction toward the rear of the outboard motor 12. Generally vertical side walls 61 and 62 rise upwardly from the inner and outer lateral periphery regions of the bottom wall 60, respectively; and a further wall portion 63 rises from the forwardmost region of the bottom wall 60 between the two lateral wall portions 61 and 62. An outlet gutter 64 extends rearwardly from the rearwardmost region of the bottom wall 60, which has no associated upwardly extending sidewall. Further, the outlet gutter 64 is provided with a steep downward slope. The rearwardmost end of the outlet gutter 64 opens toward an upper, inner portion of the side wall 36 located along the rear of the cowling's top cover 30.

A portion of the side wall 61 of each passage duct 56 adjoins a corresponding adjacent portion of each respective side wall 41 and 42 of the midway chamber 38. The upper end of each side wall 61 folds over and covers the top end of each corresponding side wall 41 and 42 of the midway chamber 38. A small gap 70 is provided between the uppermost portion of the side wall 62 of each passage duct 56 and the inner side of the top wall 34 of the cowling's top cover 30.

The pathway which intake air follows from the atmosphere through the intake port 50 and ultimately to the engine 16 will be described next.

The engine 16 is provided with an air inlet device (not shown) which opens at the front thereof. Air which is moved from the atmosphere and into the air inlet device is ultimately transferred to an engine combustion chamber whereat it is ignited in combination with a fuel charge.

First, air is moved from the atmosphere into the midway chamber 38 through the air intake port 50. Upon passing from the immediate vicinity of the air intake port 50 into the comparatively more spacious area of the midway chamber 38, the flow speed of the moving air is reduced, and consequently, water which might be entrained with the intake air falls to the bottom of the midway chamber 38, thus separating such entrained water from the intake air.

Subsequently, the intake air is moved from the midway chamber 38 through the intake air introducing ports 52 and into the intake air passage ducts 56. From this point, a majority of the intake air moves into the engine cavity 33 via the gap 70; however, a portion of the intake air may enter the engine cavity 33 via the outlet gutter 64. Ultimately, the air is inducted into the engine 16 via the induction system (not shown) and is transferred to the combustion chamber (not shown) therein.

Next, the manner in which inadvertently admitted water may be removed from the intake air, and kept away from the surface of the engine 16, will be described.

As recognized above, sometimes rather large quantities of water may undesirably enter the cowling assembly through the air intake port 50, especially when the speed of the marine vessel is quickly reduced during operation so that a wave strikes the rear of the marine vessel and outboard motor. Having entered, such water may eventually make its way into the engine cavity via the intake air introducing ports 52 and intake air passage ducts 56 and, if allowed to contact the engine 16, possibly cause damage to the surface of the engine 16 as well as other associated components. Thus, as previously discussed, it is desirable to prevent such water from contacting the engine 16 and its associated components.

In the first instance, the bottom walls 60 of the intake air passage ducts 56 can act as a barrier to water splashing upon the engine 16 since these walls 60 cover across the top of the engine 16. Additionally, most of the water which penetrates as far as the intake air passage ducts 56 will be directed toward, and will impinge upon, the inner side of the side wall 36 of the cowling top member 30 since the bottom wall 60 and the outlet gutter 64, of each intake air passage duct 56, are sloped in such a direction as to cause any water to drain in this manner. Accordingly, water so directed will subsequently flow downward along the side wall 36 towards the bottom cowling portion 32. Even water which does not hit upon the inner portion of the side wall 36 of the cowling top portion 30 will follow a path toward the bottom cowling portion 32 together with the air flow.

It is possible that some water may be present with the flow of intake air which passes from the intake air passage ducts 56 into the engine containing cavity 33, within the cowling assembly, through the gap 70. Since the gap 70 opens toward the inner side of the side wall 36 of the cowling's top cover 30, such water will either impinge upon the inner side of the side wall 36 and flow down along the side wall 36 or it will accompany the flow of moving air downward towards the lower tray 32 portion of the cowling assembly.

The lower tray 32 of the cowling assembly of the present invention is provided with a hole (not shown) through it's lower region. Thus, water which collects along the lower portion of the lower tray 32 is allowed to drain out through this hole.

As a result of the construction set forth above, it can be seen that water which penetrates deep into the intake air flow pathway of the cowling assembly of the invention will either ultimately impinge upon the inner side of the side wall 36 of the cowling's top cover 30 or will accompany the flow of moving air downward towards the lower tray 32 portion of the cowling assembly. By either route, no water, or at least very little water, is able to splash upon the outer surface of the engine 16.

Figure 5:
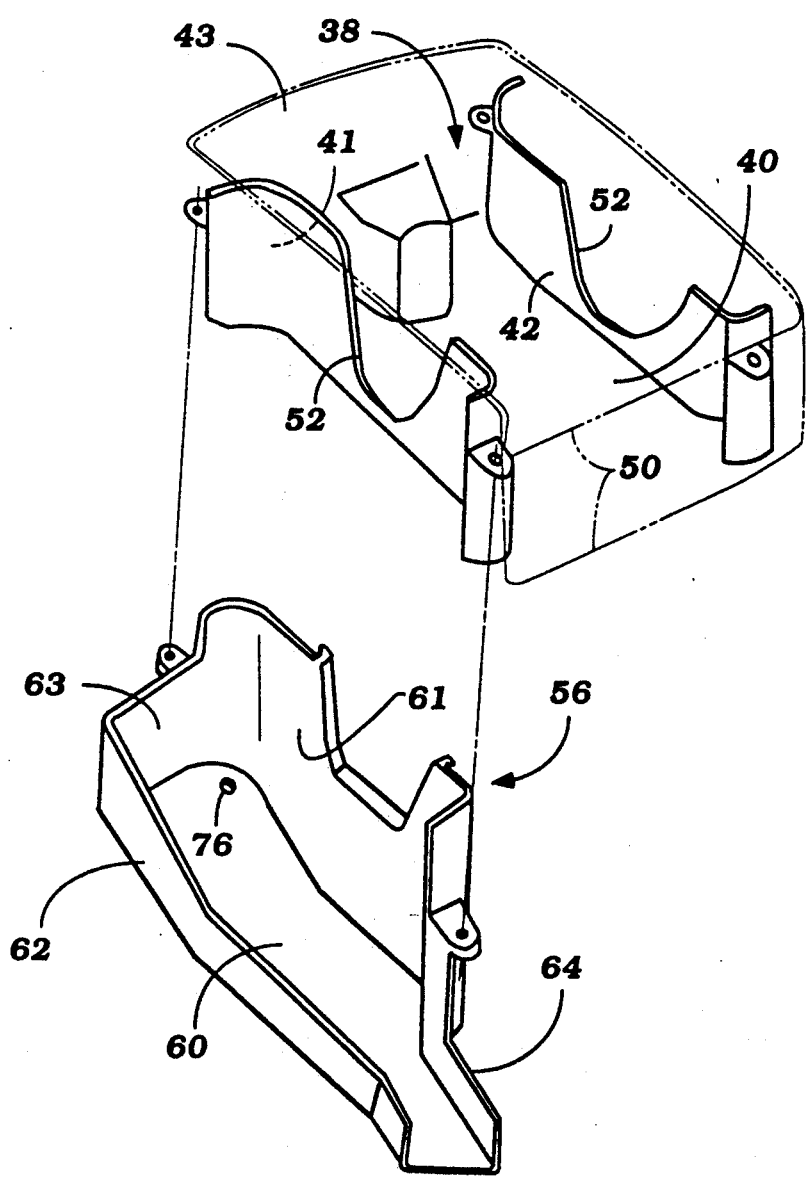
FIG. 5 is an exploded perspective view of the air flow introducing arrangement of the protective cowling in accordance with the invention.

It should be recognized that any water which has penetrated the cowling intake air arrangement and entered an intake air passage duct 56 will not be able to flow down through the outlet gutter 64 when the trim-up angle of the outboard motor 12 exceeds the slope angle of the bottom wall 60 of the intake air passage duct 56. Thus, the present invention provides a drainage hole 76 near a corner position through the intake air passage duct bottom wall 60, as illustrated in FIGS. 2, 3 and 5. Due to the placement of the drainage hole 76 toward the outer side portion of the intake air passage duct bottom wall 60, it is unlikely that any water passing therethrough would splash upon the engine 16.

Although a very effective construction has been illustrated and described above for an improved cowling and air inlet arrangement for the powerhead of an outboard motor, which will prevent water from splashing upon the outer surface of an engine contained therein, various changes and modifications may be made without departing from the spirit and scope of the invention as defined by the appended claims.

We claim:

1. A cowling and air intake arrangement for a powerhead of an outboard motor having an internal combustion engine including an induction system, comprising: a main cowling portion fixed to a lower cowling tray; an engine cavity between said main cowling portion and said lower cowling tray; an air intake chamber formed in an upper, rearward portion of said main cowling portion; an air intake port opening to the atmosphere along a rearward portion of said air intake chamber; an air passage duct positioned laterally adjacent to said air intake chamber; wherein said air intake chamber and said air passage duct are provided with respective floors which substantially partition the bottom portions of said air intake chamber and said air passage duct from said engine cavity; and, also, wherein said air intake chamber and said air passage duct are provided with respective walls which extend upwardly from said floors; and further comprising a passageway communicating said air intake chamber and said air passage duct; and a gap located between an uppermost portion of said wall of said air passage duct and an inner, upper portion of said main cowling for allowing intake air flowing towards said engine induction system to pass from said air passage duct into said engine cavity.

2. The cowling and air intake arrangement of claim 1 further comprising a cover which extends generally horizontally across the top of said air intake chamber.

3. The cowling and air intake arrangement of claim 2 wherein said air passage duct and said cover are secured to said upper cowling portion by way of a common threaded fastener.

4. The cowling and air intake arrangement of claim 2 wherein said floors of said air intake chamber and said air passage duct slope downward toward the rear of said outboard motor.

5. The cowling and air intake arrangement of claim 4 wherein said air passage duct is further provided with an outlet gutter which extends from a rearwardmost portion thereof toward the rear, inner wall of said cowling; and wherein said outlet gutter has a steeper downward grade than said floor of said air passage duct.

6. The cowling and air intake arrangement of claim 5 wherein an outward portion of said floor of said air passage duct is provided with a drainage passage therethrough.

7. The cowling and air intake arrangement of claim 6 wherein exactly one of said air passage ducts is located to one lateral side of said air intake chamber and exactly one of said air passage ducts is located to the opposing lateral side of said air intake chamber, within said main cowling portion.

8. The cowling and air intake arrangement of claim 4 wherein a rearwardmost end of said floor of said air intake chamber adjoins an inner portion of a side wall of said main cowling portion.

9. The cowling and air intake arrangement of claim 2 wherein a portion of said upwardly extending wall of said air intake chamber adjoins a portion of said upwardly extending wall of said air passage duct.

10. The cowling and air intake arrangement of claim 9 wherein said passageway communicating said air intake chamber and said air passage duct comprises a semi-circular cutaway area through said adjoining walls of said air intake chamber and said air passage duct.

11. The cowling and air intake arrangement of claim 10 wherein an upper end of said upwardly extending wall of said air passage duct folds over an upper end of said upwardly extending wall of said air intake chamber along said semi-circular cutaway area.

12. The cowling and air intake arrangement of claim 2 further comprising a water drainage passage formed through a lower region of said lower cowling tray.

13. The cowling and air intake arrangement of claim 2 wherein said air intake port, said air intake chamber, said communicating passageway, said air passage duct, said gap and said engine cavity comprise, respectively, an intake air pathway for removing any water which enters said air intake arrangement from intake air and for directing said intake air to said induction system of said engine.

14. A protective outer cowling for the internal combustion engine of an outboard motor, said protective cowling comprising a main cowling member defining at least in part a cavity in which said engine is contained, a duct forming member affixed to said main cowling member, within said main cowling member, to define an air inlet path from an atmospheric air inlet formed at least in part by said outer cowling member and said cavity, said air inlet path being defined at least in part by portions of said main cowling member and said duct forming member which extend horizontally above the outer periphery of said engine so that air entering said cavity must flow horizontally across the upper portion of said engine for preventing any entrained water from falling vertically onto said engine; and wherein a rearwardmost portion of said duct forming member an outlet gutter, said outlet gutter having a floor which slopes downwardly towards the rear of said cowling.

15. The cowling arrangement of claim 14 wherein said outlet gutter floor extends towards a rear, inner wall of said cowling.

16. The cowling arrangement of claim 14 wherein a region of said duct forming member located forwardly of said outlet gutter is provided with a floor which slopes downward towards the rear of said cowling; and wherein said floor of said outlet gutter has a steeper grade than said floor of said duct forming member located forwardly of said outlet gutter.

* * * * *

UNITED STATES PATENT AND TRADEMARK OFFICE
CERTIFICATE OF CORRECTION

PATENT NO. : 5,181,871

DATED : January 26, 1993

INVENTOR(S) : Hiraoka, et al

It is certified that error appears in the above-identified patent and that said Letters Patent is hereby corrected as shown below:

Abstract lines 2-3, "outboad" should be --outboard--.

Column 8, line 24, Claim 14, after "member" insert --constitutes--.

Signed and Sealed this

Twenty-eighth Day of December, 1993

Attest:

BRUCE LEHMAN

Attesting Officer          Commissioner of Patents and Trademarks